R. B. MEANY.
PACKING.
APPLICATION FILED DEC. 7, 1914.

1,194,408. Patented Aug. 15, 1916.

Witnesses:
Edw. W. Vaill
Veronica Braun

Inventor
R. B. Meany
By his Attorney
Ernest Hopkinson

UNITED STATES PATENT OFFICE.

RICHARD B. MEANY, OF WEEHAWKEN, NEW JERSEY, ASSIGNOR TO PEERLESS RUBBER MANUFACTURING COMPANY, A CORPORATION OF NEW YORK.

PACKING.

1,194,408.      Specification of Letters Patent.    Patented Aug. 15, 1916.

Application filed December 7, 1914. Serial No. 875,929.

*To all whom it may concern:*

Be it known that I, RICHARD B. MEANY, a citizen of the United States, residing at Weehawken, county of Hudson, State of New Jersey, have invented certain new and useful Improvements in Packing, of which the following is a full, clear, and exact disclosure.

My invention relates to packings for mechanical purposes, such as gaskets for use in joints which are subjected to high steam or other fluid pressure.

The object of my invention is to produce a gasket which not only will be uninjured by high degrees of temperature and pressure, but which also will not be liable to be blown out by reason of pressure due to the fluid to which a joint is subjected.

Figure 1:
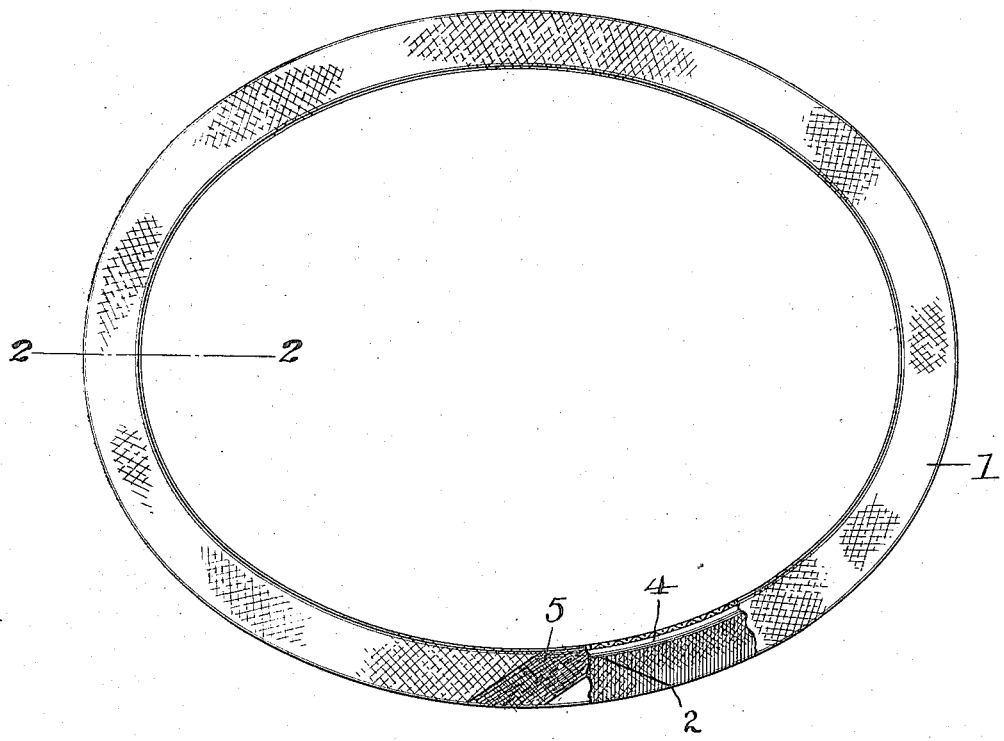
Figure 2:
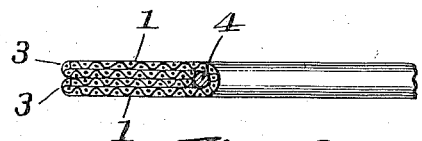

For a detail description of a preferred form of my invention, reference may be had to the following specification and to the accompanying drawings forming a part thereof, in which:

Figure 1 is a plan view of a complete gasket showing a part cut away to illustrate the interior construction. Fig. 2 is a transverse sectional view taken substantially on the line 2—2, Fig. 1, and showing a method of placing the fabric about the metallic reinforcement.

Referring to the drawing the numeral 1 indicates a strip of suitable fabric cut on the bias, or cut parallel with the warp or weft threads, as preferred. This strip may be composed of any suitable fabric combined with rubber, but I prefer to use a fabric made of asbestos fiber which is impregnated with a vulcanizable compound of rubber. Such a piece of fabric in the form of a straight strip of the requisite length to form a complete gasket, first is folded longitudinally on two parallel lines which are approximately midway between the center and the outside edges, the folded-over portion, however, leaving a central portion where there is one thickness only and of a width substantially equal to the circumference of the reinforcing member 4. The strip then has its end cut on inclined lines to form the requisite joint at the meeting point about the gasket, as indicated at 2. The strip thus prepared is placed about the reinforcing member 4 which is preferably in the form of an endless wire of steel or any other suitable metal. In this way the parallel doubled edges of the fabric are superposed one upon the other with the reinforcing member in the space between the folded-over edges, as clearly illustrated in Fig. 2. The inclined joints where the ends of the fabric meet are preferably covered by a piece of adhesive tape, as indicated at 5 in Fig. 1. The gasket thus built up is placed in a suitable vulcanizer and then vulcanized in the usual way.

It is obvious that the shape of the gasket or packing may be varied to suit different circumstances and different forms of joints to be filled with the gasket, the gasket being adapted, however, for use on manhole covers of boilers, or other similar tanks which contain liquid under high pressure and temperature.

I am aware that it is not new to form a gasket by folding over the margin or edges to make a four-ply thickness of the gasket, but I do not broadly claim such a construction. However, I believe I am the first to produce a packing or gasket in which the reinforcing member is located on the inner margin of the gasket so that any tendency to force the material of the gasket outward is prevented and the fabric or other material held under tension in a radial direction against the pressure of the interior fluid. It will also be noted that by reason of the method of placing the reinforcing member in the central folded-over portion of the gasket adjacent the ends of the folded-over margin, the said member is held firmly in position and does not materially thicken the gasket at the points where the reinforcing member is located.

Having thus described this form of my invention, what I claim and desire to protect by Letters Patent is:

1. A packing comprising a plurality of plies of flexible material, a strip of flexible material forming the outer plies, and a narrow strand of stiff inelastic material located at one margin thereof within the central portion of said strip which is folded over said strand, the remainder of said plies being located laterally of said strand and between the two outer plies and forming the inner plies of the main portion of the packing.

2. A packing comprising four plies of flexible fibrous material, and a strand of stiff wire located at the middle of a strip of said material between two of the plies thereof at one margin of the packing, the edges of two plies abutting said strand between said two outer plies and forming the inner plies of the packing, and means for securing said plies together.

3. A packing comprising four plies of a single strip of fabric impregnated with rubber, and an endless wire strand located at the middle of said strip between two of the plies thereof, the edges of said strip being turned inward and abutting said strand between said two outer plies, said plies and strand being vulcanized together.

Signed at New York State of New York this 5th day of December, 1914.

RICHARD B. MEANY.

Witnesses:
  EDW. W. VAILL,
  FRANCIS BOYLE.